(12) United States Patent
Arias-Thode et al.

(10) Patent No.: US 12,403,987 B2
(45) Date of Patent: Sep. 2, 2025

(54) SPLIT RELEASE BENTHIC LANDER

(71) Applicant: Naval Information Warfare Center Pacific, San Diego, CA (US)

(72) Inventors: Yolanda Meriah Arias-Thode, San Diego, CA (US); David B Chadwick, San Diego, CA (US); Kevin Hardy, San Diego, CA (US); Alexander Stevens-Bracy, Chula Vista, CA (US); Gregory Wayne Anderson, San Diego, CA (US); Matthew Lanford Bond, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 633 days.

(21) Appl. No.: 17/824,799

(22) Filed: May 25, 2022

(65) Prior Publication Data

US 2023/0382500 A1   Nov. 30, 2023

(51) Int. Cl.
  *B63B 22/24*   (2006.01)
  *H01M 8/16*   (2006.01)
  *B63B 22/00*   (2006.01)

(52) U.S. Cl.
  CPC ............. *B63B 22/24* (2013.01); *H01M 8/16* (2013.01); *B63B 2022/006* (2013.01); *H01M 2250/10* (2013.01)

(58) Field of Classification Search
  CPC ......... B63B 21/00; B63B 21/26; B63B 22/00; B63B 22/24; H01M 8/00; H01M 8/16; G01N 1/00; G01N 1/08; G01N 1/14
  USPC .......................................................... 114/331
  See application file for complete search history.

(56) References Cited

U.S. PATENT DOCUMENTS

| | | | | |
|---|---|---|---|---|
| 4,058,945 A * | 11/1977 | Knapp | ...................... | E04B 1/32 |
| | | | | 114/312 |
| 4,692,906 A * | 9/1987 | Neeley | ...................... | G01V 1/38 |
| | | | | 367/15 |
| 6,625,083 B2 * | 9/2003 | Vandenbroucke | ....... | G01V 1/16 |
| | | | | 367/16 |
| 7,965,583 B2 * | 6/2011 | Thomas | ................... | G01V 1/38 |
| | | | | 367/16 |
| 9,162,740 B2 | 10/2015 | Hardy | | |

(Continued)

OTHER PUBLICATIONS

Ross, Steve; Benthic Landers: Critical Tools for Use in Deep-sea Research; Available online at https://oceanexplorer.noaa.gov/explorations/12midatlantic/background/benthiclanders/benthiclanders.html; Estimated publication date: 2012.

*Primary Examiner* — Lars A Olson
(74) *Attorney, Agent, or Firm* — Naval Information Warfare Center Pacific; Kyle Eppele

(57) ABSTRACT

A benthic lander can include a frame structure that comprises a plurality of frames, wherein each frame is formed with a central aperture, and a first plurality of coupling structures coupling adjacent frames of the plurality of frames. The benthic lander can also include at least one pressure vessel formed with an interior cavity comprising electronics disposed within the interior cavity. Each pressure vessel can be disposed within the central aperture of at least one frame of the plurality of frames such that the at least one frame holds the pressure vessel in place. A weight structure can be disposed underneath the frame structure, wherein the weight structure is removably coupled to the frame structure.

20 Claims, 9 Drawing Sheets

(56) References Cited

U.S. PATENT DOCUMENTS

| | | | |
|---|---|---|---|
| 9,496,577 B2 | 11/2016 | Arias-Thode et al. | |
| 10,539,696 B2* | 1/2020 | Ray | G01V 1/18 |
| 2018/0097237 A1 | 4/2018 | Chadwick et al. | |
| 2019/0368978 A1* | 12/2019 | Sheryll | G01N 1/08 |
| 2021/0273251 A1 | 9/2021 | Bond et al. | |

* cited by examiner

SPLIT RELEASE BENTHIC LANDER

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 211090) is assigned to the United States Government and is available for licensing for commercial purposes. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil.

BACKGROUND OF THE INVENTION

Benthic landers are used to place various devices at the bottom of marine environments. The task of deploying the devices is a costly, time consuming, and difficult process. Divers cannot be used at large depths (e.g., greater than ~100 ft.), and some environments inhibit or prohibit the usage of divers (e.g., dangerous diving conditions, areas sensitive to human presence, etc.). Benthic landers having a benthic microbial fuel cell (BMFC) system present additional challenges for deployment. A BMFC consists of an anode, a cathode and an intermediate electrical load. The anode electrode is typically buried in the seafloor sediment at a depth sufficient to sustain anaerobic metabolic activity of surrounding microbial colonies. As the microbes consume surrounding nutrients they convert organic compounds into a small, but harvestable amount of electrical energy. Methods of deploying benthic microbial fuel cells typically employ divers to install BMFC anodes into the sediment. Because BMFC anodes can be delicate, their installation may be a challenging task for divers in the marine environment. A system is needed for installing and retrieving devices without the use of divers.

SUMMARY OF THE INVENTION

The present invention relates to a benthic lander for depositing equipment to the bottom of a bottom of water.

According to an illustrative embodiment of the present disclosure, a benthic lander can include a frame structure that comprises a plurality of frames, wherein each frame is formed with a central aperture, and a first plurality of coupling structures coupling adjacent frames of the plurality of frames. The benthic lander can also include at least one pressure vessel formed with an interior cavity comprising electronics disposed within the interior cavity. Each pressure vessel can be disposed within the central aperture of at least one frame of the plurality of frames such that the at least one frame holds the pressure vessel in place. A weight structure can be disposed underneath the frame structure, wherein the weight structure is removably coupled to the frame structure. The weight structure is configured to autonomously decouple from the frame structure a period of time after the benthic landing system reaches a benthic floor.

According to a further illustrative embodiment of the present disclosure, a BMFC can include a frame structure that comprises a plurality of frames, wherein each frame is formed with a central aperture, and a first plurality of coupling structures coupling adjacent frames of the plurality of frames. The BMFC can also include at least one pressure vessel formed with an interior cavity comprising electronics disposed within the interior cavity. Each pressure vessel can be disposed within the central aperture of at least one frame of the plurality of frames such that the at least one frame holds the pressure vessel in place. At least one cathode can be disposed around the frame structure. A weight structure can be disposed underneath the frame structure, wherein the weight structure is removably coupled to the frame structure. The weight structure is configured to autonomously decouple from the frame structure a period of time after the benthic landing system reaches a benthic floor. The weight structure can include a mat and at least one anode coupled to a bottom side of the mat.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

Throughout the several views, like elements are referenced using like references. The elements in the figures are not drawn to scale and some dimensions are exaggerated for clarity.

The detailed description of the drawings particularly refers to the accompanying figures in which.

DETAILED DESCRIPTION OF THE INVENTION

The embodiments of the invention described herein are not intended to be exhaustive or to limit the invention to precise forms disclosed. Rather, the embodiments selected for description have been chosen to enable one skilled in the art to practice the invention.

Figure 1:
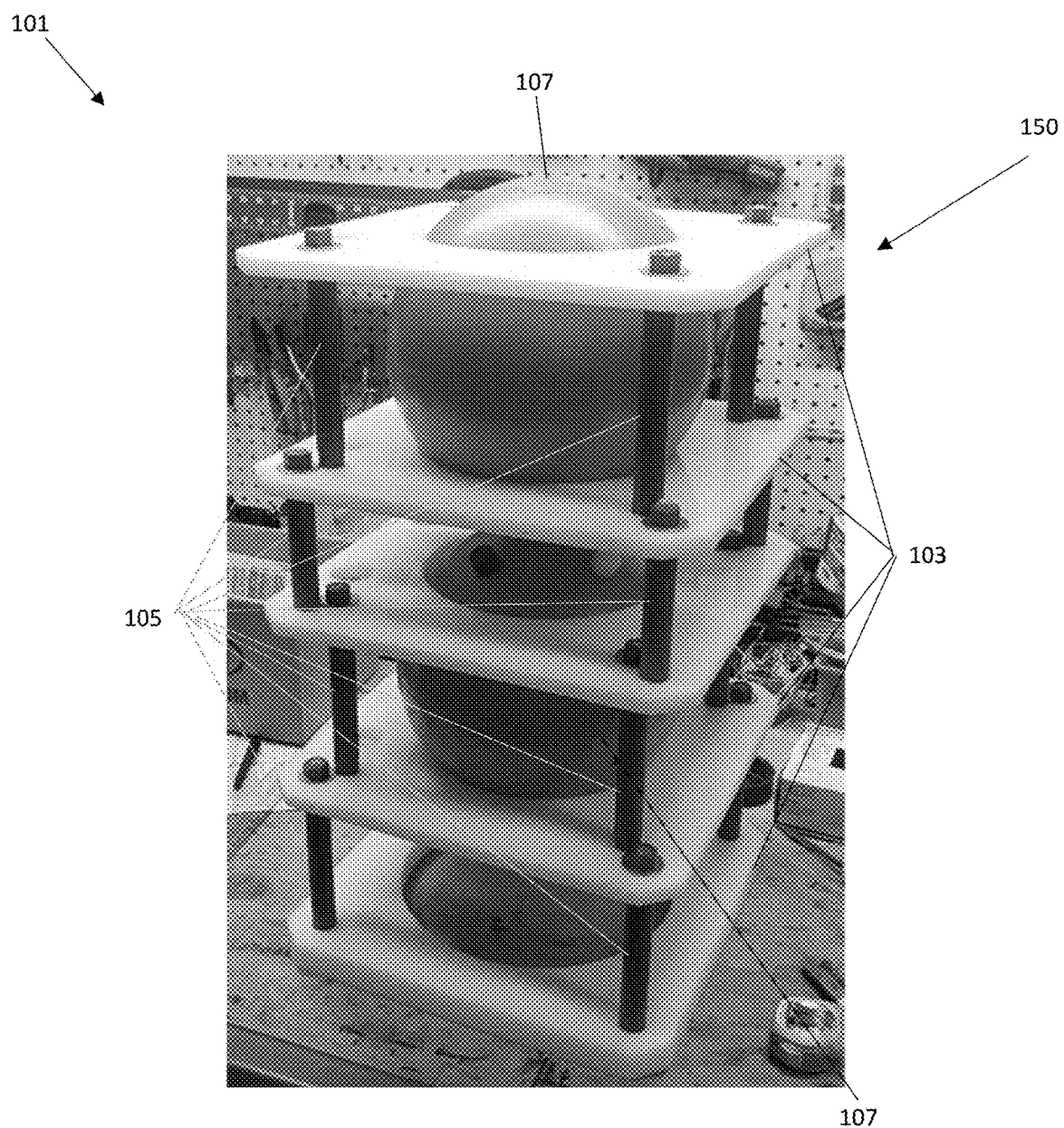
FIG. 1 shows the frame structure of an exemplary benthic lander system.

FIG. 1 shows the frame structure 150 of an exemplary benthic lander system 101. Exemplary systems 101 are designed to operate in at least three phases. In a first phase, the system 101 sinks to the bottom of a body of water and deploys a weight structure (e.g., unfurling a rubber mat). In a second phase, the system 101 remains at the bottom of the body of water and generates power while performing any secondary functions (e.g., taking sensor measurements, filling energy storage devices, etc.). In a third phase, the weight structure (250) decouples from the frame structure of system 101 to allow the frame structure 150 to rise to the surface of the water for recovery. Exemplary frame structures 150 can include a plurality of frames 103 to provide support for other components. A first plurality of coupling structures 105 (e.g., rods, bolts, screws, etc.) can couple the plurality of frames together. The plurality of frames 103 can be formed with a plurality of coupling apertures in which the first plurality of coupling structures can be disposed. Exemplary systems 101 can include at least one pressure vessel 107. The pressure vessels 107 can be airtight such that electronics and other sensitive equipment can be stored inside the pressure vessel. Gas stored within the pressure vessel can provide buoyancy forces to maintain orientation of the frame and facilitate the recovery of the frame structure. Each frame 103 can be formed with a central aperture so that the at least one pressure vessel 107 can be held in place by one frame (e.g., disposed within one frame) or multiple frames (e.g., sandwiched between two frames).

Figure 2:
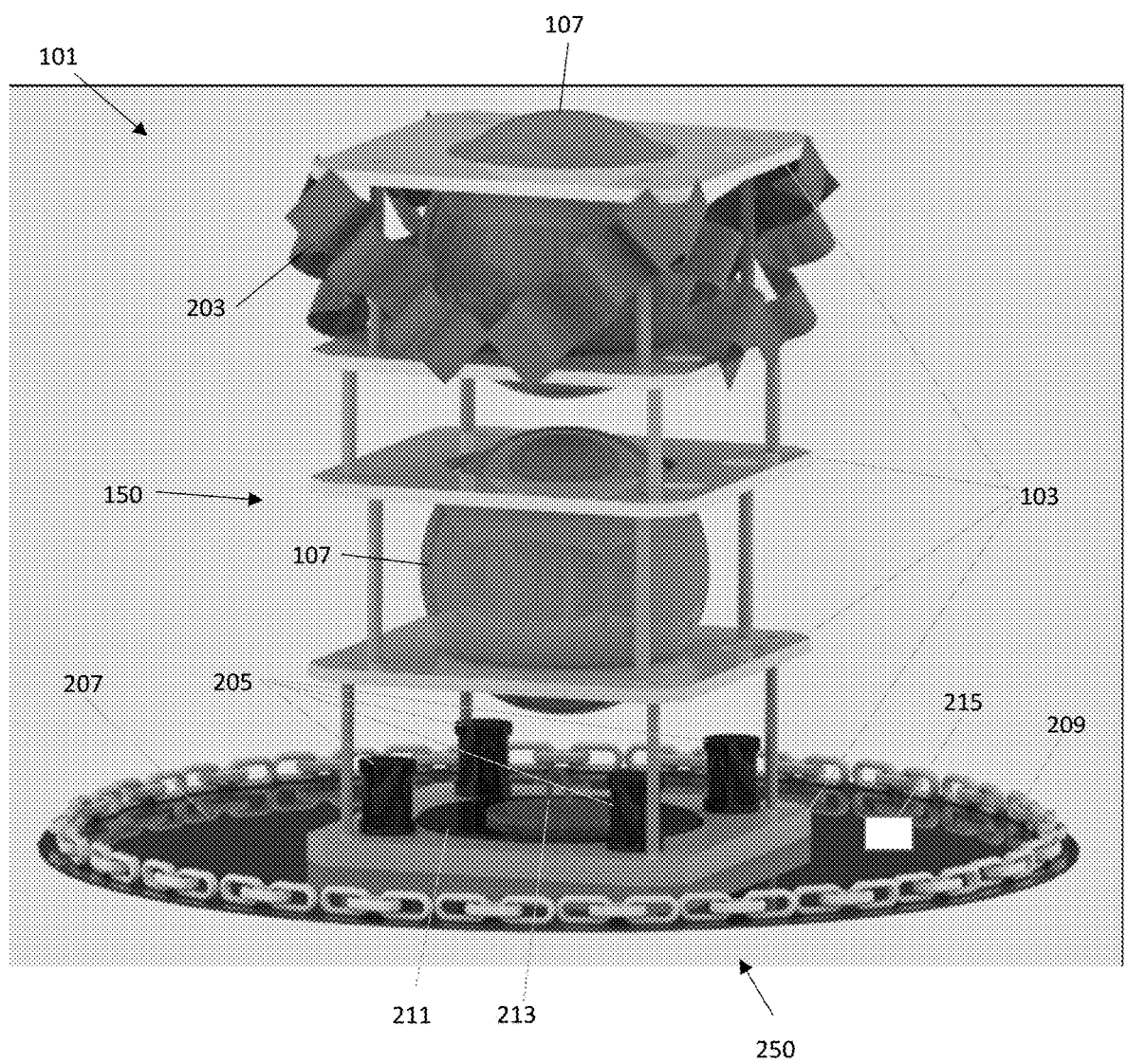
FIG. 2 shows an exemplary benthic lander system in a post-deployment configuration.

FIG. 2 shows an exemplary benthic lander system 101 in a post-deployment configuration. Frame structure 150 is removably coupled to weight structure 250. In exemplary embodiments of the system, benthic lander system 101 can be a BMFC. At least one cathode 203 can be disposed around an upper portion of the frame structure 150 (e.g., between the topmost frames 103). In exemplary systems, cathode 203 can be a single continuous section of material (e.g., carbon cloth). In exemplary systems, cathode 203 can be a plurality of isolated or interlinked sections of material. In exemplary systems, the at least one cathode 203 can be formed with a plurality of scrunchy fringes to increase surface for better power generation. The scrunchy fringes can be formed by gathering or scrunching carbon cloth over an internal wire to increase the surface area of carbon cloth over the length of the wire. Frames 103 can be formed with a plurality of edge apertures in which at least one ballast weight 205 can be disposed. Ballast weights 205 can be disposed in the bottom-most frame 103 to balance system 101 while it sinks and to keep the system from toppling post-deployment. Weight structure 250 provides weight forces that exceed the buoyancy forces of the frame structure 150 so that the system 101 sinks when the frame structure is coupled to the weight structure. By using pressure vessels 107 with buoyant forces exceeding the weight forces of the frame structure 150, the frame structure will automatically rise to the surface when the frame structure is not coupled to weight structure 250. Weight structure 250 includes weight 211. Weight 211 can be formed with a coupling structure 213 (e.g., a U-bolt, etc.) to facilitate coupling to the frame structure 150. Weight structure 250 can include a mat 207 coupled to the weight 211. Mat 207 can be flexible to allow the mat to fold around the frame structure 150 during deployment. Mat 207 can be made with an oxygen impermeable material so that the floor below the mat becomes anaerobic over time. In environments where the mat 207 will be naturally buried quickly (e.g., areas with fast moving particulates such as hydrothermal vents, etc.), the mat does not need to be oxygen impermeable. Weight structure 250 can include a weight line 209 coupled to mat 207 to help mat form a sealed pocket below the mat by preventing water or solid obstacles (e.g., debris, animals, etc.) from lifting the mat and introducing oxygen to the pocket. Alternatively, mat 207 can be made with weighted edges. In exemplary systems, at least one sensor 215 can be coupled to mat 207.

Figure 3:
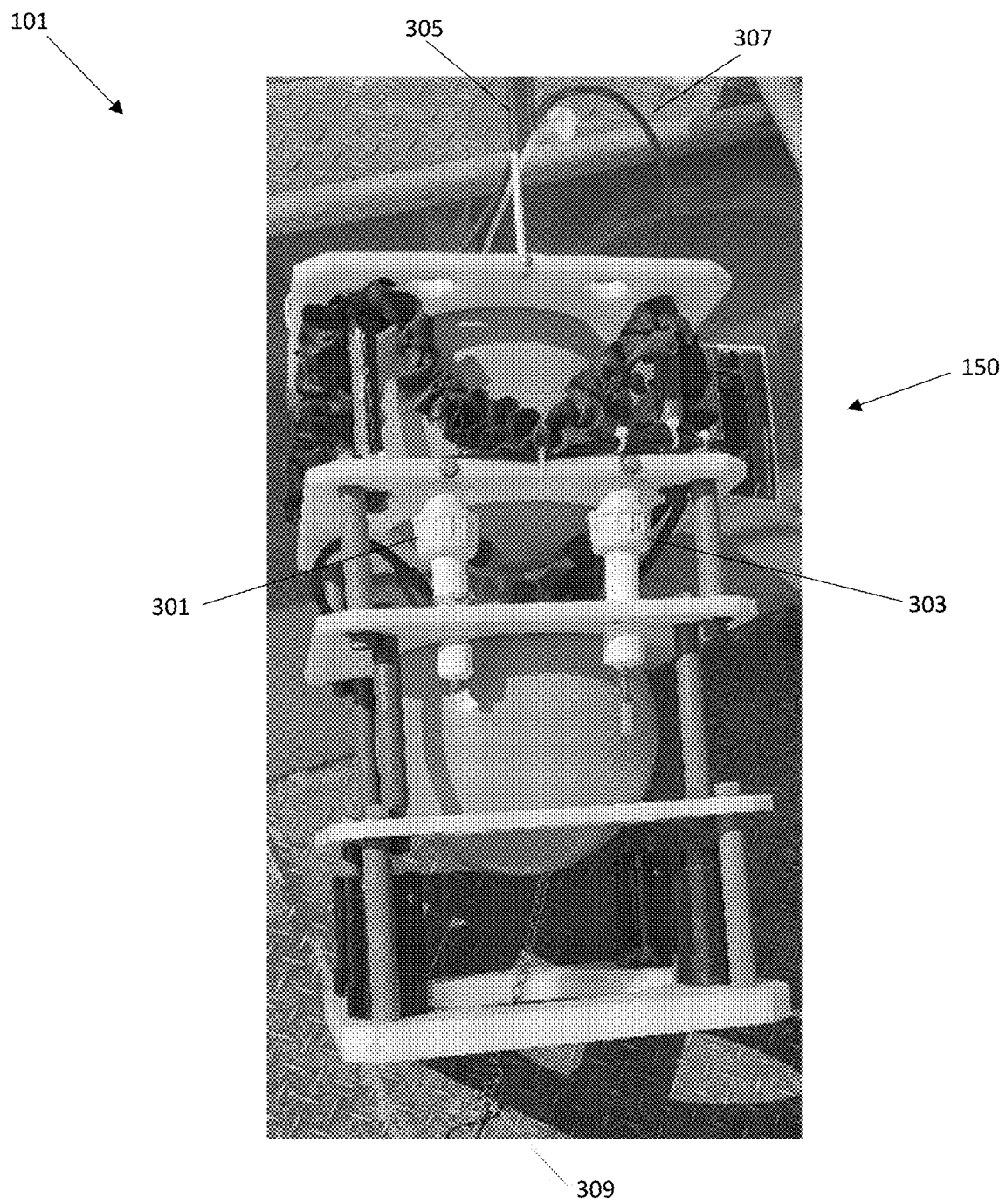
FIG. 3 shows an exemplary benthic lander system in a post-release configuration.

FIG. 3 shows an exemplary benthic lander system 101 in a post-release configuration. A timing mechanism 301 (see also 303) can be used to removably coupled frame structure 150 to a weight structure. Timing mechanism 301 can be coupled to a coupling line 309 such that a first end of the line is coupled to the timing mechanism and a second end of the line is coupled to a frame of frame structure 150. Timing mechanism 301 can be coupled to a coupling line 309 such that first and second ends of the line are both coupled to the timing mechanism. Coupling line 309 can be coupled to the weight structure (e.g., threaded through a U-bolt, directly attached, etc.) to couple the frame structure 150 to the weight structure. When the timing mechanism 301 activates, at least one end of the coupling line 309 is released. A signal structure 305 can be attached to an uppermost frame of frame structure 150 to facilitate visual identification of system 101 or to make it easier to locate the system post-release (e.g., when the system is floating at the surface). A carrying structure 307 can be attached to an uppermost frame of frame structure 150 to facilitate system transportation pre-deployment (e.g., allow a user to carry system) and facilitate system retrieval post-release (e.g., allow a user to lift the system out of the water).

Figure 4:
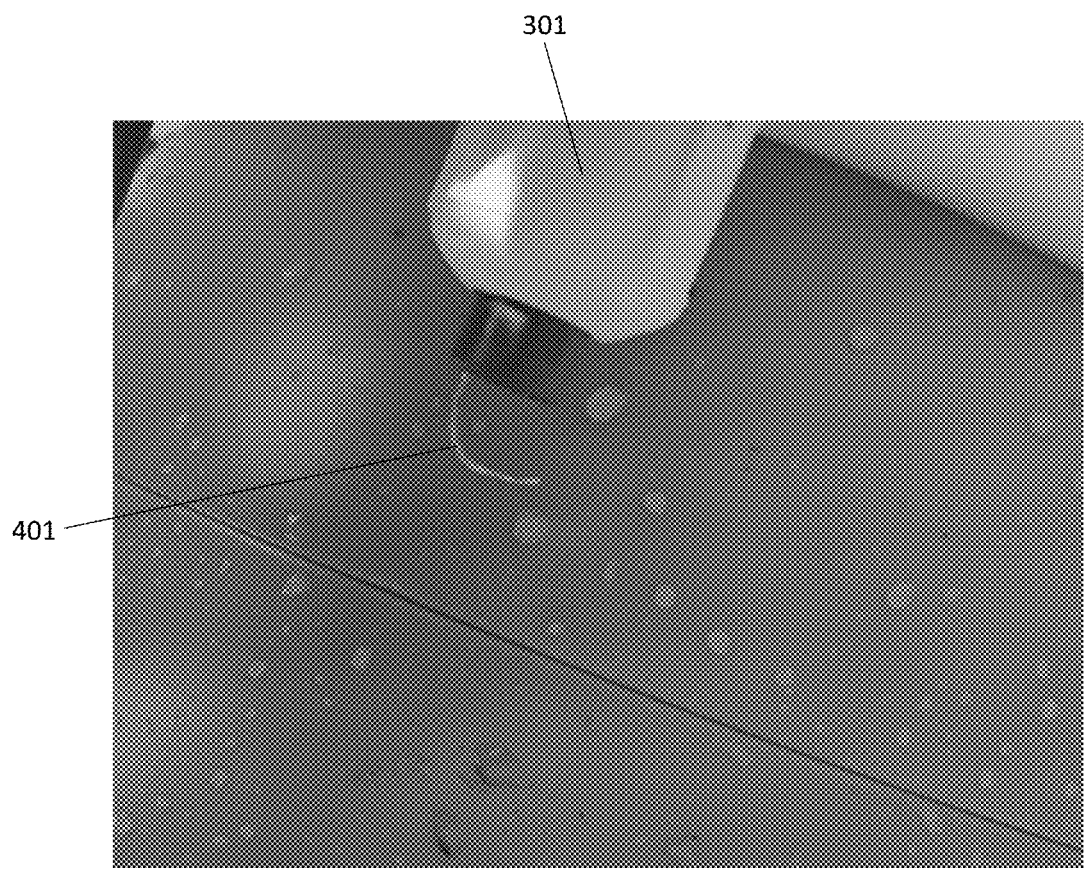
FIG. 4 shows part of an exemplary weight release mechanism.

FIG. 4 shows an exemplary timer mechanism 301 portion of a weight release mechanism. Timer mechanism 301 can be formed with a timing loop 401. In exemplary embodiments of the system, at least one end of a coupling line can be coupled to timing loop 401. When timer mechanism 301 activates, at least one end of timing loop 401 is released such that the coupling line is released. In exemplary systems, timing loop 401 can be a burn wire that that burns after the timer mechanism 301 activates (e.g., a burn-wire triggers a galvanic reaction for a wire hoop to erode, melt, or dissolve). Timer mechanism 301 can be configured to activate automatically after a predetermined period of time (e.g., after a one month operational period, etc.). Timer mechanism 301 can be configured to activate after receiving an activation signal from an external source. Timer mechanism 301 can be configured to activate a predetermined period of time after receiving an activation signal (e.g., ten minutes, one hour, etc.) to provide a buffer period for canceling activation. In exemplary embodiments, timer mechanism 301 can be electrically coupled to electronics within a pressure vessel. Timer mechanism 301 can be configured to activate after receiving an activation signal from the electronics a period of time after reaching the benthic floor. For example, if a sensor within the pressure vessel detects a predetermined condition (e.g., temperature, motion, acidity, etc.), it can send an activation signal to timer mechanism 301. As another example, a pressure vessel can be configured to send an activation signal to timer mechanism 301 once an energy storage device within the pressure vessel is fully charged.

Figure 5:
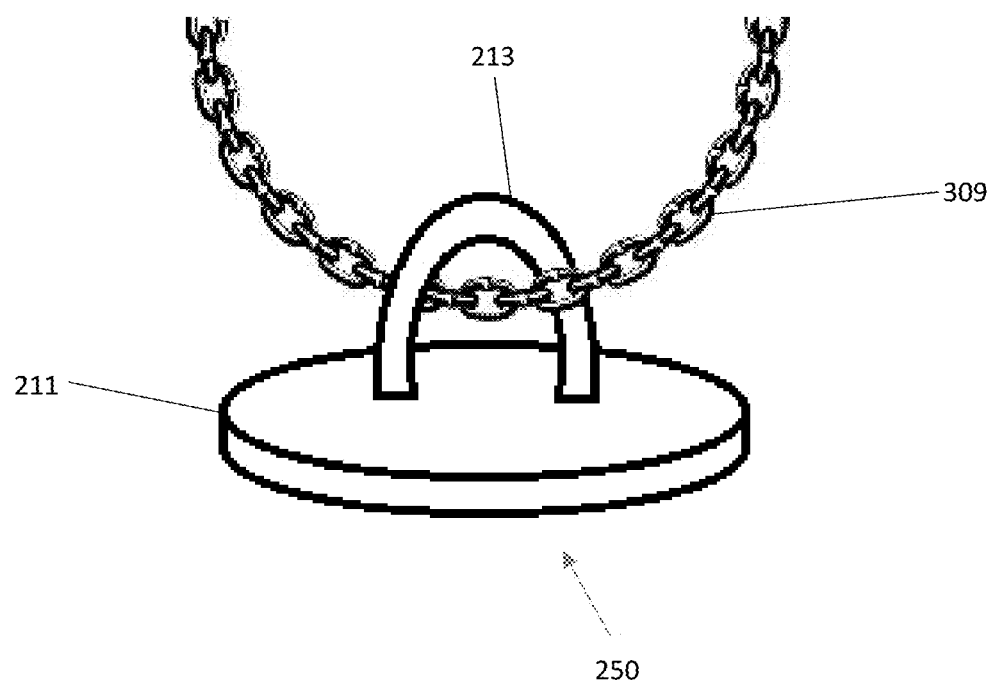
FIG. 5 shows another part of an exemplary weight release mechanism.

FIG. 5 shows an exemplary weight structure 250 portion of a weight release mechanism. Weight 211 can be formed with a coupling structure 213 (e.g., a U-bolt, attachment point, etc.) to facilitate coupling to the frame structure. When a timing mechanism activates, at least one end of the coupling line 309 (e.g., a metal chain, a polypropylene rope, etc.) is released so that the line can freely flow through coupling structure 213, thereby decoupling weight structure 250 from the frame structure. In other embodiments of the system, coupling line 309 can be coupled directly to coupling structure 213. In other embodiments of the system, coupling line 309 can be coupled directly to weight 211 such that including a coupling structure 213 is unnecessary.

Figure 6:
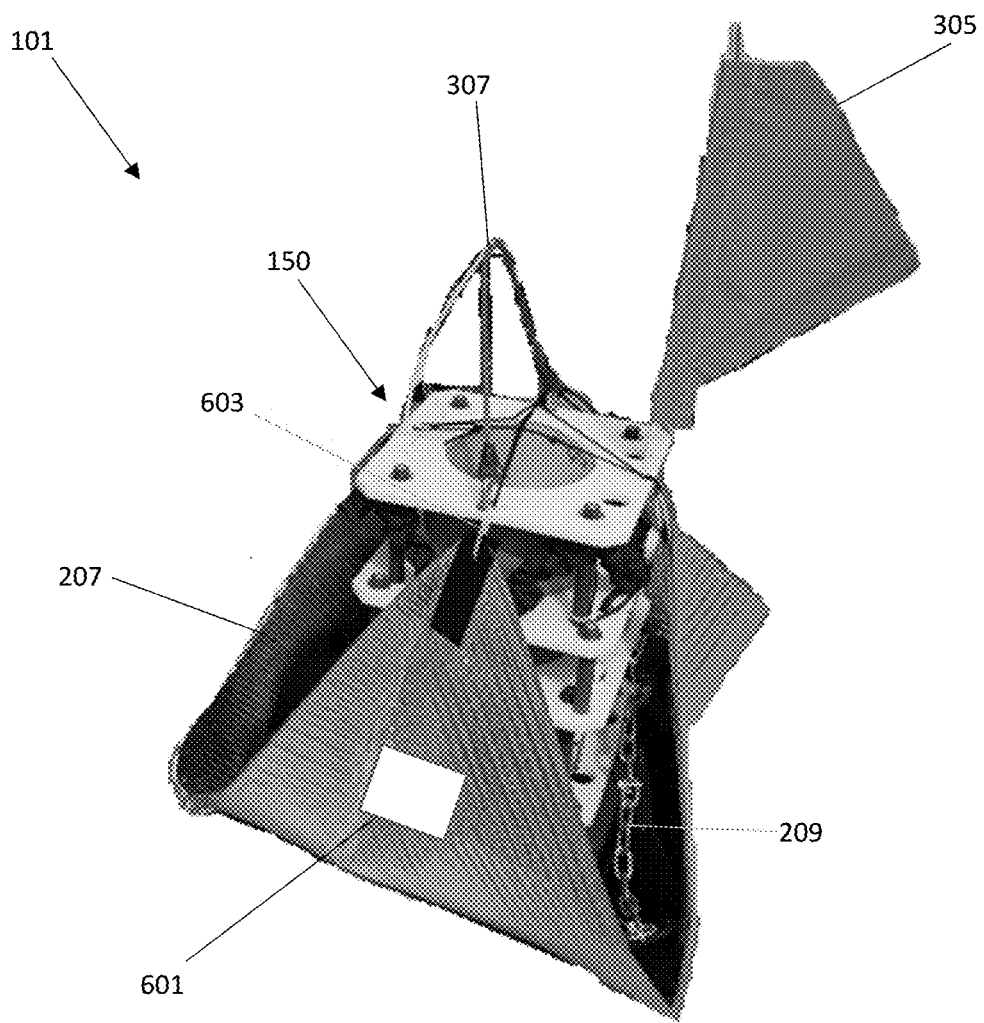
FIG. 6 shows an exemplary benthic lander system in a pre-deployment configuration.

FIG. 6 shows an exemplary benthic lander system 101 in a pre-deployment configuration. In exemplary embodiments of the system, system 101 can be a BMFC, wherein at least one anode 601 is coupled to an underside of mat 207. Mat 207 can be folded upwards around frame section 150 to facilitate a consistent fall to benthic zone. Mat 207 can be removably coupled to frame section 150 with a plurality of fasteners 603. Fasteners 603 can be configured to detach once the system 101 reaches the benthic floor. In exemplary embodiments of the system, fasteners 603 can be water soluble cables that naturally dissolve over time in water so that no timing mechanisms are required.

Figure 7:
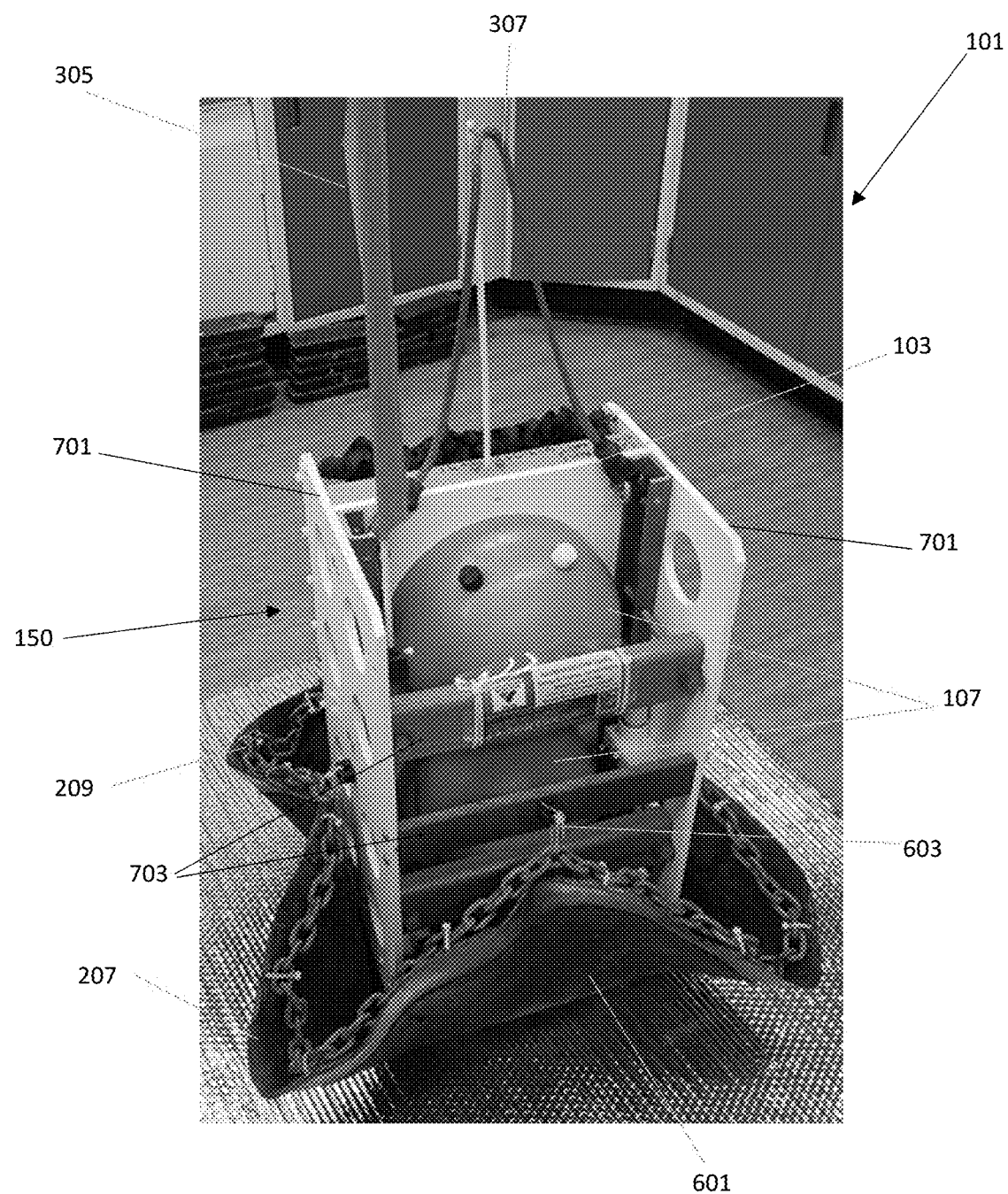
FIG. 7 shows an exemplary benthic lander system in a pre-deployment configuration.

FIG. 7 shows an exemplary benthic lander system 101 in a pre-deployment configuration. Frame structure 150 can include side frames 701 for structural support. Pressure vessels 107 can be disposed within one frame 103. Frame structure 150 can include horizontal support members 703 coupled to side frames 701 to provide additional structural support. Mat 207 can be removably coupled to horizontal support members 703 with a plurality of fasteners 603.

Figure 8:
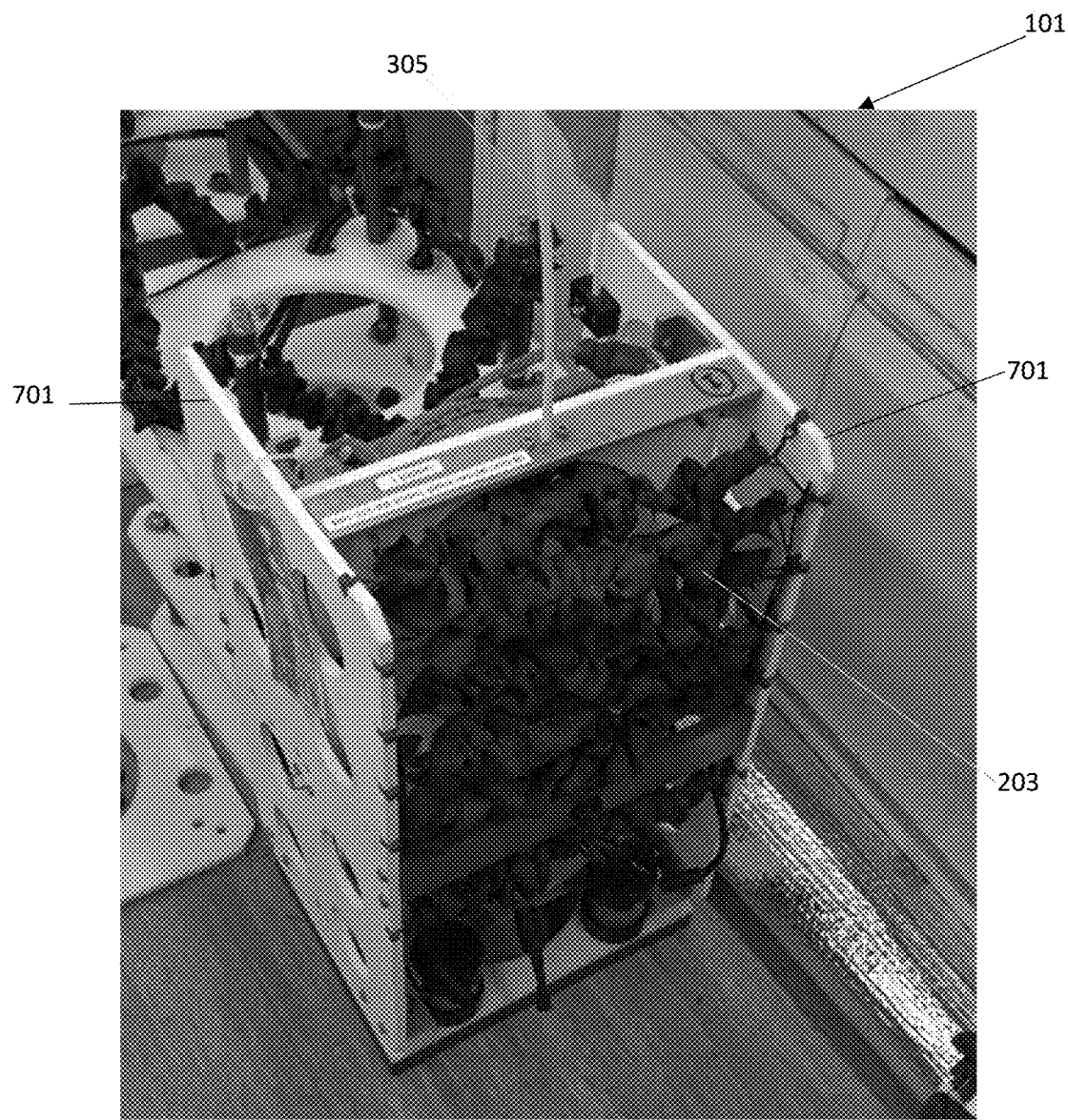
FIG. 8 shows an exemplary benthic lander system in a post-release configuration.

FIG. 8 shows an exemplary benthic lander system. A plurality of cathodes 203 can be coupled to horizontal support members.

Figure 9:
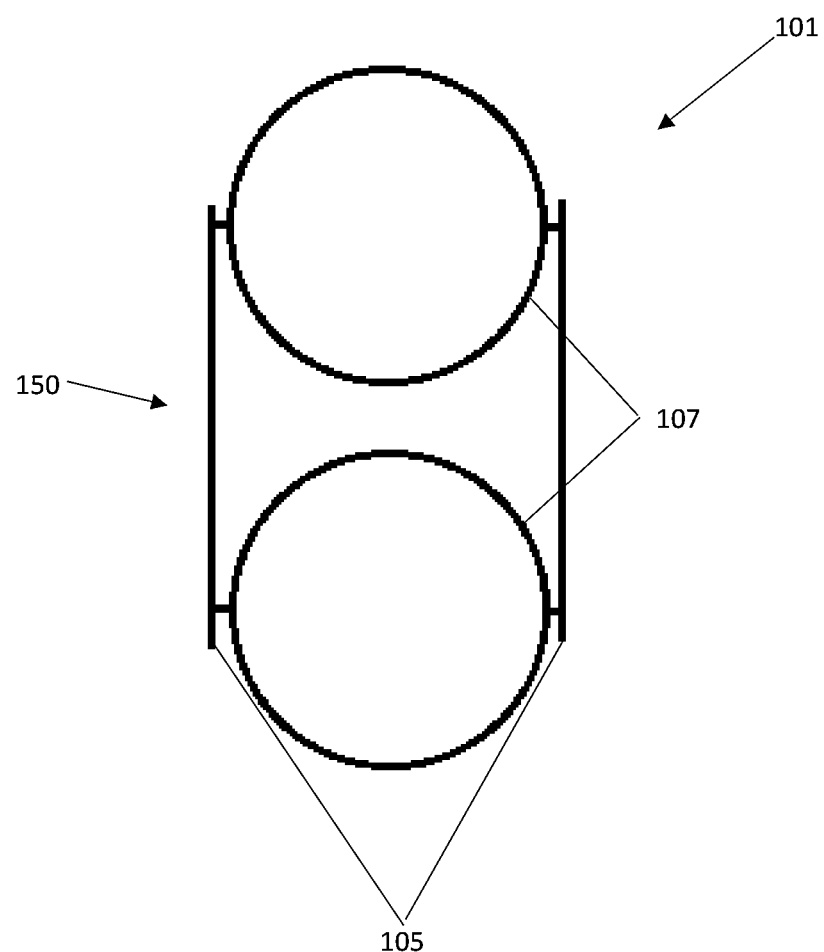
FIG. 9 shows an exemplary benthic lander system with a flexible support structure.

FIG. 9 shows an exemplary benthic lander system with a flexible support structure. Frame structure 150 can provide support without including frames by coupling a plurality of pressure vessels 107 together with a first plurality of coupling structures 105. In exemplary systems, the first plurality of coupling structures 105 can be flexible cables held taut by the buoyant forces of the pressure vessels 107. Bottom ends of the first plurality of coupling structures 105 can be coupled to a weight structure. Other components (e.g., fasteners 603, timing mechanism 301, side frames, etc.) can be coupled to the first plurality of coupling structures 105. In embodiment that use side frames, the other components can be coupled to the side frames instead of the coupling structures 105.

Although the invention has been described in detail with reference to certain preferred embodiments, variations and modifications exist within the spirit and scope of the invention as described and defined in the following claims.

The invention claimed is:

1. A benthic landing system comprising:
a frame structure comprising:
a plurality of frames, wherein each frame is formed with a central aperture; and
a first plurality of coupling structures coupling adjacent frames of the plurality of frames;
at least one pressure vessel formed with an interior cavity comprising electronics disposed within the interior cavity; wherein each pressure vessel of the at least one pressure vessel is disposed within the central aperture of at least one frame of the plurality of frames;
a weight structure disposed underneath the frame structure, wherein the weight structure is removably coupled to the frame structure, wherein the weight structure is configured to autonomously decouple from the frame structure a period of time after the benthic landing system reaches a benthic floor; and
wherein the frame structure is less dense than water and the frame structure and weight structure coupled together are more dense than water.

2. The system of claim 1, further comprising:
at least one ballast weight;
wherein a bottom-most frame of the plurality of frames is formed with at least one edge aperture; and
wherein the at least one ballast weight is disposed within the at least one edge aperture.

3. The system of claim 1, further comprising a coupling line, wherein the weight structure comprises a weight formed with a coupling section, wherein the weight is disposed within a central aperture of a bottommost frame of the plurality of frames, wherein the coupling line removably couples the coupling section to the frame section.

4. The system of claim 3, the frame structure further comprising at least one timing mechanism coupled to a frame of the plurality of frames and removably coupled to the coupling line; wherein the timing mechanism is configured to decouple from at least one end of the coupling line after receiving an activation signal.

5. The system of claim 4, the timing mechanism further comprising a timing loop, wherein the coupling line is removably coupled to the timing loop.

6. The system of claim 5, wherein the timing mechanism is configured to initiate a galvanic reaction that burns the timing loop after receiving the activation signal.

7. The system of claim 1, the weight structure further comprising a mat and at least one sensor coupled to the mat.

8. A fuel cell system comprising:
a frame structure comprising:
a plurality of frames, wherein each frame is formed with a central aperture; and
a first plurality of coupling structures coupling adjacent frames of the plurality of frames;
at least one pressure vessel formed with an interior cavity comprising electronics disposed within the interior cavity; wherein each pressure vessel of the at least one pressure vessel is disposed within the central aperture of at least one frame of the plurality of frames;
at least one cathode disposed around the frame structure; and
a weight structure comprising a mat and at least one anode coupled to a bottom side of the mat, wherein the weight structure is disposed underneath the frame structure and the weight structure is removably coupled to the frame structure, wherein the weight structure is configured to autonomously decouple from the frame structure a period of time after the benthic landing system reaches a benthic floor.

9. The system of claim 8, further comprising:
at least one ballast weight;
wherein a bottom-most frame of the plurality of frames is formed with at least one edge aperture; and
wherein the at least one ballast weight is disposed within the at least one edge aperture.

10. The system of claim 8, wherein the frame structure is less dense than water and the frame structure and weight structure coupled together are more dense than water.

11. The system of claim 8, the weight structure further comprising a weight line disposed around an outermost section of a top side of the mat.

12. The system of claim 11, wherein the weight line is removably coupled to the frame structure by a water soluble fastener.

13. The system of claim 8, wherein the mat is formed with a weighted edge section along outer edges of the mat.

14. The system of claim 8, further comprising a coupling line, wherein the weight structure comprises a weight formed with a coupling section, wherein the weight is disposed within a central aperture of a bottommost frame of the plurality of frames, wherein the coupling line removably couples the coupling section to the frame section.

15. The system of claim 14, the frame structure further comprising at least one timing mechanism coupled to a frame of the plurality of frames and removably coupled to the coupling line; wherein the timing mechanism is configured to decouple from at least one end of the coupling line after receiving an activation signal.

16. The system of claim 15, the timing mechanism further comprising a timing loop, wherein the coupling line is removably coupled to the timing loop.

17. The system of claim 16, wherein the timing mechanism is configured to initiate a galvanic reaction that burns the timing loop after receiving the activation signal.

18. A benthic landing system comprising:
at least one pressure vessel formed with an interior cavity comprising electronics disposed within the interior cavity;
a frame structure comprising: a first plurality of coupling structures each coupled to the at least one pressure vessel;
a weight structure disposed underneath the frame structure, wherein the weight structure is removably coupled to the frame structure, wherein the weight structure is configured to autonomously decouple from the frame structure a period of time after the benthic landing system reaches a benthic floor; and
wherein the frame structure is less dense than water and the frame structure and weight structure coupled together are more dense than water.

19. The system of claim 18, further comprising a plurality of side frames coupled to the coupling structures.

20. The system of claim 18, the weight structure further comprising a mat and at least one sensor coupled to the mat.

* * * * *